UNITED STATES PATENT OFFICE.

HERBERT RICHMOND AND WALTER S. RICHMOND, OF NEW YORK, N. Y.

IMPROVEMENT IN CANCELING AND WRITING INKS.

Specification forming part of Letters Patent No. 203,372, dated May 7, 1878; application filed March 13, 1878.

*To all whom it may concern:*

Be it known that we, HERBERT RICHMOND and WALTER S. RICHMOND, of the city, county, and State of New York, have invented certain new and useful Improvements in Writing or Canceling Inks; and we hereby declare the same to be fully, clearly, and exactly described as follows:

While the composition of matter which forms the subject of our invention is applicable for use as ordinary writing-ink, when diluted to the proper consistency, it is especially adapted for use as a canceling-ink for postage or revenue stamps, for which latter purpose it is eminently fitted by reason of its absolute indelibility—a feature which is also of great value in using the ink, in its diluted state, for writing wills, checks, and other similar legal or commercial documents.

The said ink consists of the following ingredients, viz: Eosine, aniline-black, aniline-blue, cupric chloride, sodium chlorate, ammonium chloride, (sal-ammoniac,) glycerine, lamp-black, water, and oil. These substances are taken in the following proportions: Eosine, one part; aniline-black, four parts; aniline-blue, two parts; cupric chloride, one part; ammonium chloride, three parts; sodium chlorate, two parts, and of the remaining ingredients a sufficient quantity to bring the ink to the proper consistency for the use for which it is intended.

The ingredients are thoroughly incorporated by grinding or stirring, when the composition is ready for use.

The ink described is absolutely indelible. Stamps canceled therewith are effectually destroyed, and the fraudulent alteration of matter written therewith is impossible.

The rationale of the operation of the ink is as follows: Besides having as an ingredient aniline-black, it embodies also the substances necessary to produce that color—to wit, an aniline, an oxidizing agent, and a cupric salt. The reaction of these substances is, however, retarded by the oil, which also forms a part of the ink. As a consequence the aniline-black, which is a product of the reaction of the ingredients of the ink, is partly formed within the body of the stamp-paper.

We are aware that it is not new to employ aniline-black or its homologues in inks, and therefore do not claim such, our invention consisting, essentially, in such a compound as contains the ingredients for forming aniline-black, and for retarding the reaction sufficiently to defer its completion until after the ink shall have been applied to the paper or surface upon which it is to be used.

Having thus described our invention, what we claim as new, and desire to secure by Letters Patent of the United States, is—

1. An ink for writing or canceling having as ingredients an aniline, an oxidizing agent, an oil, and a cupric salt, substantially as described.

2. The ink herein described, consisting of eosine, black and blue aniline, cupric chloride, sodium chlorate, ammonium chloride, glycerine, and oil, substantially as and for the purposes set forth.

HERBERT RICHMOND.
WALTER S. RICHMOND.

Witnesses as to H. Richmond:
EDWARD S. HATCH,
P. ALOYSIUS NOLAN,
CHAS. E. POUCHER, Jr.

Witnesses as to W. S. Richmond:
A. J. FALLS,
J. C. MCCOFFREY.